United States Patent Office 2,923,805
Patented Feb. 2, 1960

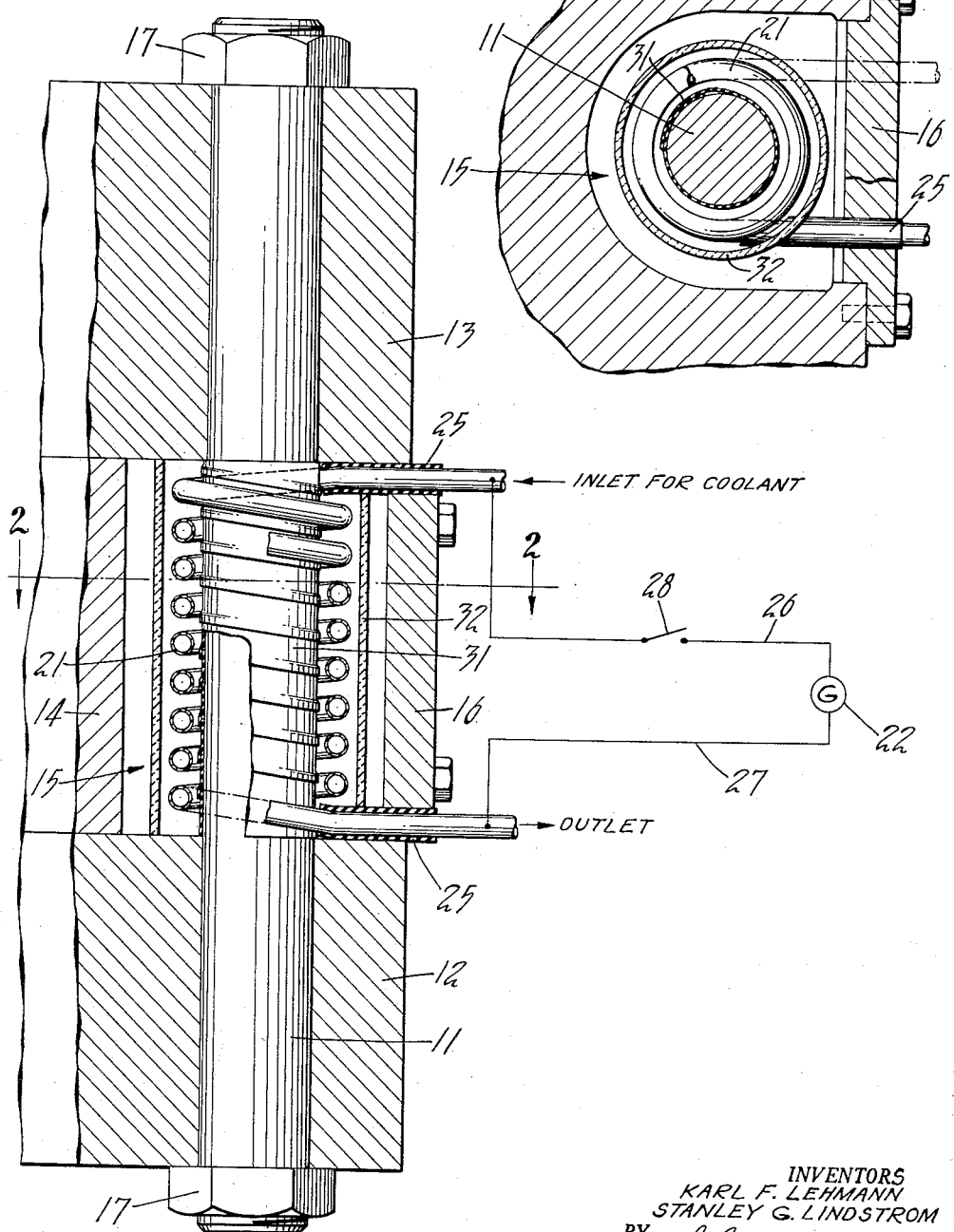

2,923,805
METHOD OF AND APPARATUS FOR HEATING TIE RODS

Karl F. Lehmann, Union, and Stanley G. Lindstrom, West Orange, N.J., assignors to American Can Company, New York, N.Y., a corporation of New Jersey Application February 12, 1958, Serial No. 714,759

8 Claims. (Cl. 219—50)

The present invention relates to a method of and apparatus for heating tie rods or long bolts utilized to secure machine parts and the like together tightly upon contraction of the rods or bolts and has particular reference to heating the rods or bolts electrically while they are in place in the machine parts.

In the manufacture of heavy machinery such as metal forming and cutting presses, the main frames usually are made in sections which are secured together by the clamping elements of tie rods or bolts which extend through the frame parts. Clamping elements, such as nuts on the ends of the tie rods usually are provided to draw the the parts together to effect a rigid unitary structure. The tie rods often are of heavy stock, ranging from three to six or more inches in diameter and therefore considerable difficulty is experienced in drawing up the clamping elements tight manually. Usually the rods are heated to elongate them a predetermined amount, and the nuts tightened as much as possible manually while in this elongated condition, so that upon allowing the rods to cool, they contract and thus draw the machine parts together under a predetermined load or stress which binds the parts together in an exceedingly tight relation.

The heating of the tie rods to elongate them, usually is effected by the application of blow torches to them. In this manner of heating it is almost impossible to obtain uniform heating of the rods, where more than one is used and therefore unequal elongation is experienced and unequal stresses are set up on different portions of the parts to be secured together. This manner of heating also causes the flames of the torch to play upon and heat portions of the machine parts adjacent the tie rods, especially where the rods are closely surrounded or enclosed, and this results in nonuniform heating of the machine parts which usually sets up deleterious strains in the parts and expansion which offsets the expansion or elongation of the rods. Metallurgical as well as dimensional changes in the parts take place under such conditions, especially when the parts are cast iron and this affects the desired tightening action of the tie rods upon cooling.

The instant invention contemplates the overcoming of these difficulties by the electrical application of heat to the tie rods alone.

An object of the invention is to effect a controlled predetermined elongation or expansion of the tie rods by way of an electric heating of the rods so that the degree of heat and the region of the application of the heat can be definitely controlled.

Another object is to provide for heating of the tie rod alone so as to obtain uniform heating of the rod and to protect parts adjacent the rod from the heat so as to prevent expansion of the parts and resulting deleterious effects on the ultimate tightening or clamping action of the rods on the parts.

Another object is to prevent metallurgical changes in the machine parts adjacent the tie rods during the rod heating operation.

Another object is to obtain the desired elongation of the tie rods through low temperature heat applied thereto.

Another object is to effect proper heating of the tie rods without distortion of the rods and the parts adjacent thereto and to prevent uneven strains and stresses therein.

Another object is to provide a heating device which can be readily incorporated in the structure to be tied together and which may be utilized repeatedly for disassembly of the structure parts as well as for their assembly.

Another object is the provision of such a heating device which can be used in a small or inaccessible space where it is impossible to use a torch flame.

Referring to the drawings:

Figure 1 is a sectional view of a plurality of machine parts held together by a tie rod conditioned in accordance with the steps of the instant method invention, the view showing a rod heating apparatus embodying the instant invention and a wiring diagram of certain of the electric devices used in the apparatus, parts being broken away; and Fig. 2 is a sectional view taken substantially along the line 2—2 in Fig. 1.

As a preferred and exemplary embodiment of the instant invention the drawings illustrate a method of and apparatus for heating and elongating a metal tie rod 11 for the purpose of subsequently, upon cooling, drawing or clamping tightly together a plurality of machine parts 12, 13, 14 which may be parts such as heavy frame or other parts of a metal working press or other machine. A recess 15 or other opening around a portion of the tie rod 11, preferably is provided in one of the machine parts 12, 13, 14 to apply heat to the rod. In a conventional machine a plurality of these tie rods 11 may be used to properly bind the parts together. In the instant case a cap 16 is utilized to close an open side of the recess 15. Nuts 17 threadedly engage with the ends of the tie rod 11 are used to draw and hold the parts together.

In accordance with the steps of the instant method invention, the tie rod 11 is first assembled with the machine parts 12, 13, 14 and the nuts 17 are screwed down firmly against the machine parts to loosely hold them together. An electric current conductor 21 is arranged adjacent a portion of the tie rod and the conductor is connected to a source of electric current, such as a generator or induction machine 22. The conductor 21 may be coiled around the tie rod 11 as shown in the drawings or may extend through an axial hole in the center of the rod, or may be otherwise arranged in any suitable manner.

Electric current passing along the conductor 21 heats the adjacently disposed portion of the tie rod 11 and thus causes the rod to elongate. This elongation of the rod 11 causes the nuts 17 to move with the rod, away from the adjacent machine part, thus creating a space between the nuts and the machine part. The space created depends upon the degree and length of time of heating. It has been found that a 12 inch heating coil surrounding a 3½ inch diameter tie rod, when held at 390 degrees F. for 10 minutes will create a space of 28 thousandths of an inch, at 600 degrees F. for 23 minutes, a space of .048 inch and at 680 degrees F. for 28 minutes, a space of .054 inch. By controlling the temperature and the time any desired elongation of the tie rod may be accurately obtained. Definite control of uniform heating of the rod may also be obtained.

With the desired elongation of the rod 11 effected, the nuts 17 are turned down as tightly as manually possible, while the rod is elongated. The current is then disconnected from the conductor 21 and the tie rod 11 allowed to cool. This cooling may be accelerated if desired by the application of a cooling medium to the tie rod. This cooling action causes the rod to contract and thereby draw the machine parts together under a load or stress which is predetermined by the amount of elongation of the rod, and which thereby unites the machine parts into a rigid, tightly joined, unitary structure.

If at some future time it is desired to disassemble the machine parts, the rod 11 by a repeat application of heat in accordance with this method, may be again elongated the required amount to relieve the load or stress on the parts to permit easy removal of the nuts 17. It has been found that by the use of such a method, the elongation of the tie rods 11 may be effected very rapidly thereby saving a great deal of time and effort.

A preferred and exemplary form of apparatus for carrying out the method steps is shown in the drawings, in which the conductor 21 is a tubular coil disposed in the recess 15 in the machine part 14 and surrounding the tie rod 11 in spaced relation thereto. The ends of the coil 21 extend out through electric insulating sleeves 25 in the cap 16. These protruding ends of the coil 21 preferably are connected to a source of cooling medium which is circulated through the coil to keep it cool and to also accelerate the cooling of the tie rod 11 after an elongating operation.

The protruding ends of the coil 21 are also electrically connected by wires 26, 27 to the generator or induction machine 22. A normally open electric switch 28 in the circuit is provided to connect and disconnect the source of electric current to and from the coil. Preferably a conventional induction heating machine is used to transmit electric current to the coil 21 so that the current is induced into the portion of the tie rod 11 covered by the coil, to thereby heat this portion of the tie rod through molecular excitation.

In order to prevent jumping of sparks from the coil 21 to the tie rod 11 during the heating operation, the rod preferably is electrically insulated by having a fibre glass tape or other suitable insulating tape 31 wrapped around the portion of the rod enclosed within the recess 15. In a similar manner the portions of the machine parts adjacent the coil 21 are protected against spark jumps and against undesired heating by an insulating sleeve 32 which is disposed within the recess 15 and surrounding the coil 21.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. A method of tightly securing machine parts together between the clamping elements of tie rods, comprising the steps of assembling a tie rod and said machine parts with the clamping elements of the rod loosely applied, arranging an electric current conductor adjacent a portion of said tie rod spaced from and disposed between the clamping elements thereon, connecting said conductor to a source of electric current to heat and elongate said tie rod, tightening said tie rod clamping elements against said machine parts while said tie rod is elongated, and disconnecting said source of electric current from said conductor whereby said tie rod in cooling contracts and draws said machine parts together tightly between its clamping elements.

2. A method of the character defined in claim 1 with the added step of passing a coolant through said conductor after said clamping elements are tightened to hasten contraction of the rod.

3. An apparatus for elongating tie rods preparatory to tightening them to insure predetermined stress on machine parts held together by clamping elements on said rods, comprising an electric current conductor disposed adjacent a mid portion of a said tie rod spaced from and disposed between the clamping elements thereon, and a source of electric current temporarily connected to said conductor for temporarily heating and elongating said clamping elements, whereby said tie rod may be manually tightened while said tie rod is elongated and said parts drawn together under stress between said clamping elements upon contraction of the tie rod.

4. An apparatus of the character defined in claim 3 wherein said conductor is a coil surrounding said mid-portion of the tie rod.

5. An apparatus of the character defined in claim 3 wherein said conductor is a tubular coil surrounding said mid-portion of the tie rod and through which a cooling medium is circulated for effecting rapid contraction of the tie rod after the clamping elements are tightened.

6. An apparatus of the character defined in claim 3 wherein there is provided an insulating element disposed around said tie rod to protect said rod against spark jump from said conductor.

7. An apparatus of the character defined in claim 3 wherein there is provided an insulating element disposed between said conductor and said adjacent machine parts to protect said parts against heat and spark jumps from said conductor.

8. A mechanical joint comprising a plurality of juxtaposed machine parts, a rod extending through openings in said parts and having clamping elements thereon disposed at opposite outer sides of said parts for drawing the parts together and clamping them in a joint, an electrical conductor coiled around a mid-portion of said rod spaced from both of said clamping elements, said coiled conductor being disposed in a recess formed in at least one of said parts and having its ends protruding from said joint, and a source of electrical current temporarily connected to said protruding ends of the conductor for temporarily heating said mid-portion of the rod to elongate the rod temporarily, whereby said clamping elements may be tightened on the machine parts while the rod is elongated and said parts drawn together under greater stress upon contraction of the rod.

References Cited in the file of this patent

UNITED STATES PATENTS

| | | |
|---|---|---|
| 1,447,730 | Post | Mar. 6, 1923 |
| 1,839,850 | Hodgkinson | Jan. 5, 1932 |
| 2,176,601 | Bates | Oct. 17, 1939 |
| 2,306,709 | Miller | Dec. 29, 1942 |
| 2,521,740 | Osborn | Sept. 21, 1950 |
| 2,743,348 | Boyajean | Apr. 24, 1956 |